E. C. SPRINGER.
LAWN MOWER SHARPENER.
APPLICATION FILED APR. 3, 1918.

1,285,825.

Patented Nov. 26, 1918.
4 SHEETS—SHEET 1.

INVENTOR:
Ernest C. Springer,
BY F. G. Fischer,
ATTORNEY.

E. C. SPRINGER.
LAWN MOWER SHARPENER.
APPLICATION FILED APR. 3, 1918.

1,285,825.

Patented Nov. 26, 1918.
4 SHEETS—SHEET 2.

Witness:
R. E. Hamilton

INVENTOR:
Ernest C. Springer,
BY F. G. Fischer
ATTORNEY.

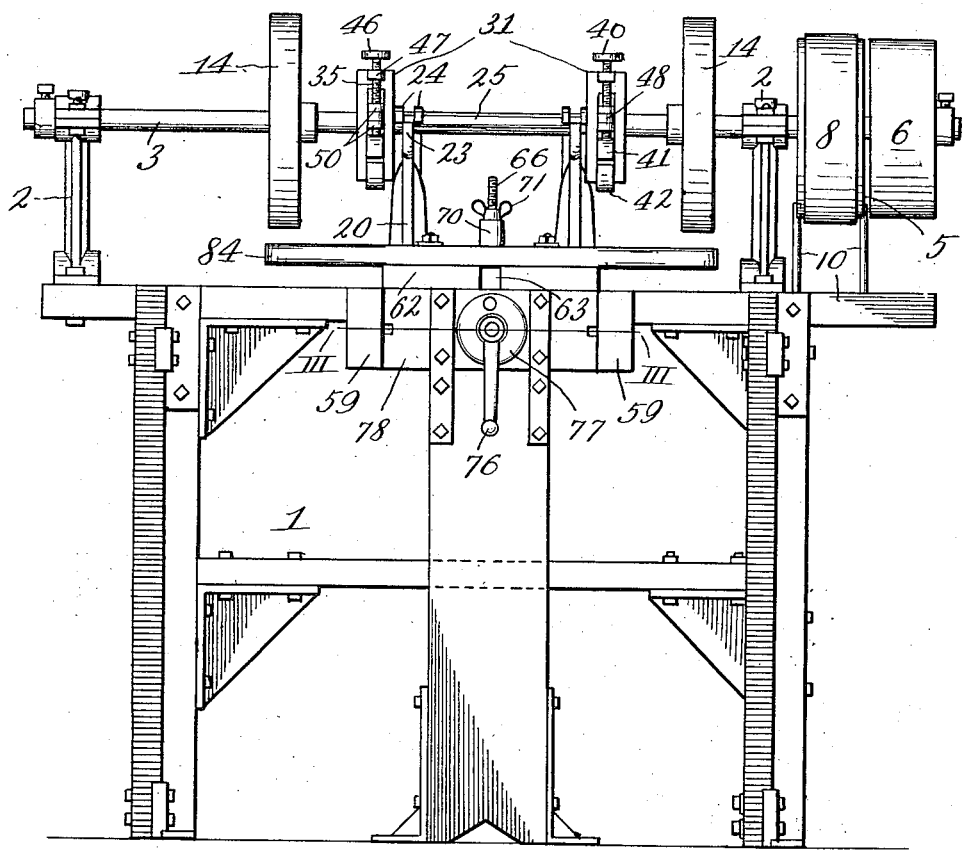

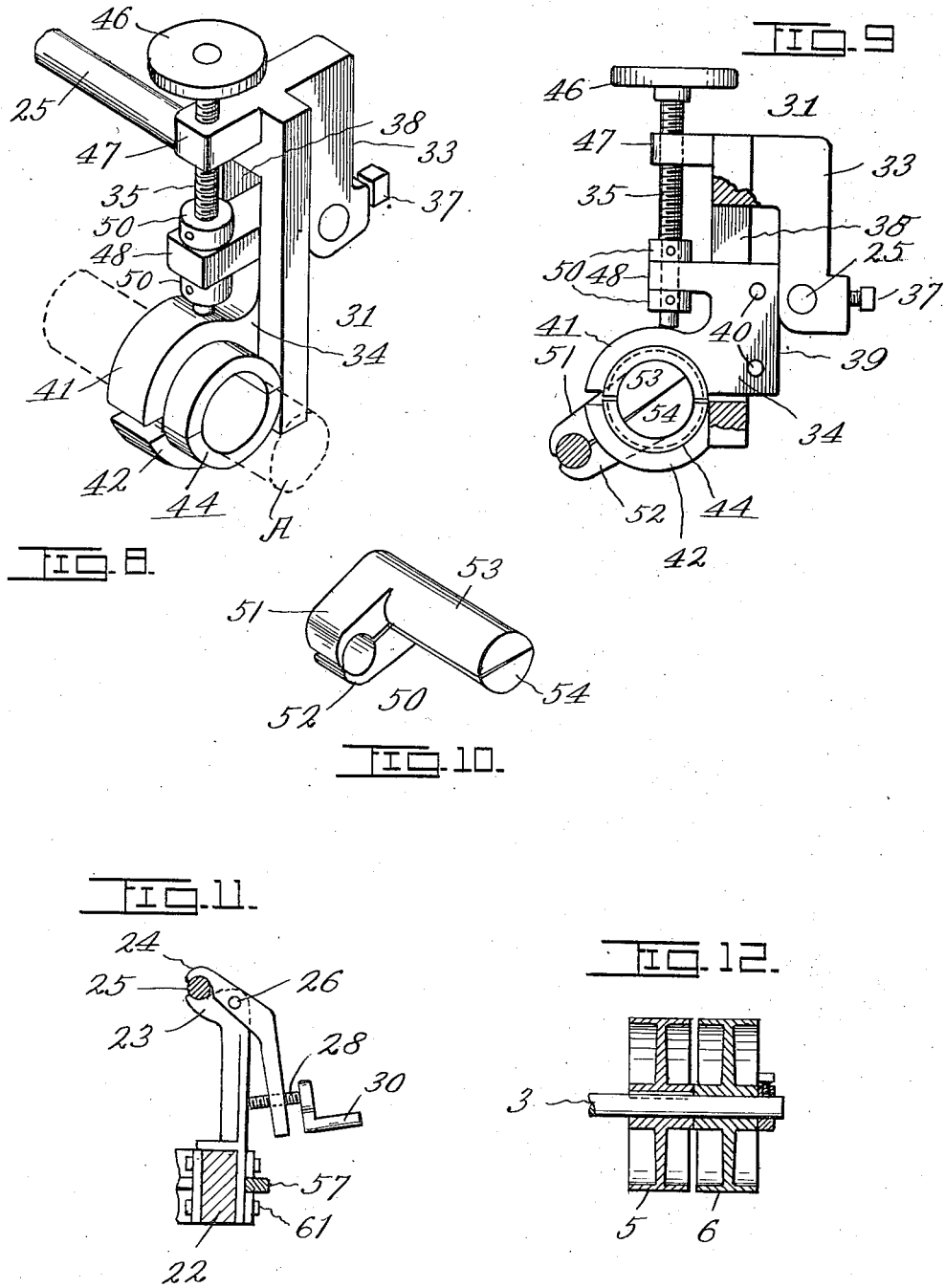

UNITED STATES PATENT OFFICE.

ERNEST C. SPRINGER, OF KANSAS CITY, MISSOURI, ASSIGNOR OF ONE-HALF TO VIRGIL A. KEMPER, OF KANSAS CITY, MISSOURI.

LAWN-MOWER SHARPENER.

1,285,825.                    Specification of Letters Patent.       Patented Nov. 26, 1918.

Application filed April 3, 1918. Serial No. 226,426.

*To all whom it may concern:*

Be it known that I, ERNEST C. SPRINGER, a citizen of the United States, residing at Kansas City, in the county of Jackson and State of Missouri, have invented certain new and useful Improvements in Lawn-Mower Sharpeners, of which the following is a specification.

My invention relates to lawn mower sharpeners, and one object is to provide an efficient machine of this character whereby the knives of a lawn mower can be quickly and accurately ground without removing any parts of said lawn mower. A further object is to provide a machine which will accommodate the different types and sizes of lawn mowers.

Other objects of the invention will hereinafter appear, and in order that said invention may be fully understood, reference will now be made to the accompanying drawings, in which:

Fig. 4 is a front elevation of the machine.

Fig. 5 is a vertical cross section of the carriage and associated parts, on line V—V of Fig. 2.

Fig. 6 is a vertical cross section of the carriage and associated parts on line VI—VI of Fig. 2.

Fig. 7 is a detail, perspective view of a crank whereby the machine may be manually operated.

Fig. 8 is a detail perspective view of means for supporting the forward portion of a lawn mower.

Fig. 9 is a vertical section of the parts disclosed by Fig. 8, with an additional clamp member for holding certain types of lawn mowers.

Fig. 10 is a detail, perspective of the additional clamp disclosed on Fig. 9.

Fig. 11 is a sectional view on line XI—XI of Fig. 1.

Fig. 12 is a horizontal section on line XII of Fig. 2, showing a portion of a shaft with tight and loose pulleys employed in carrying out the invention.

Similar reference characters indicate corresponding parts throughout the different views.

Figure 1:
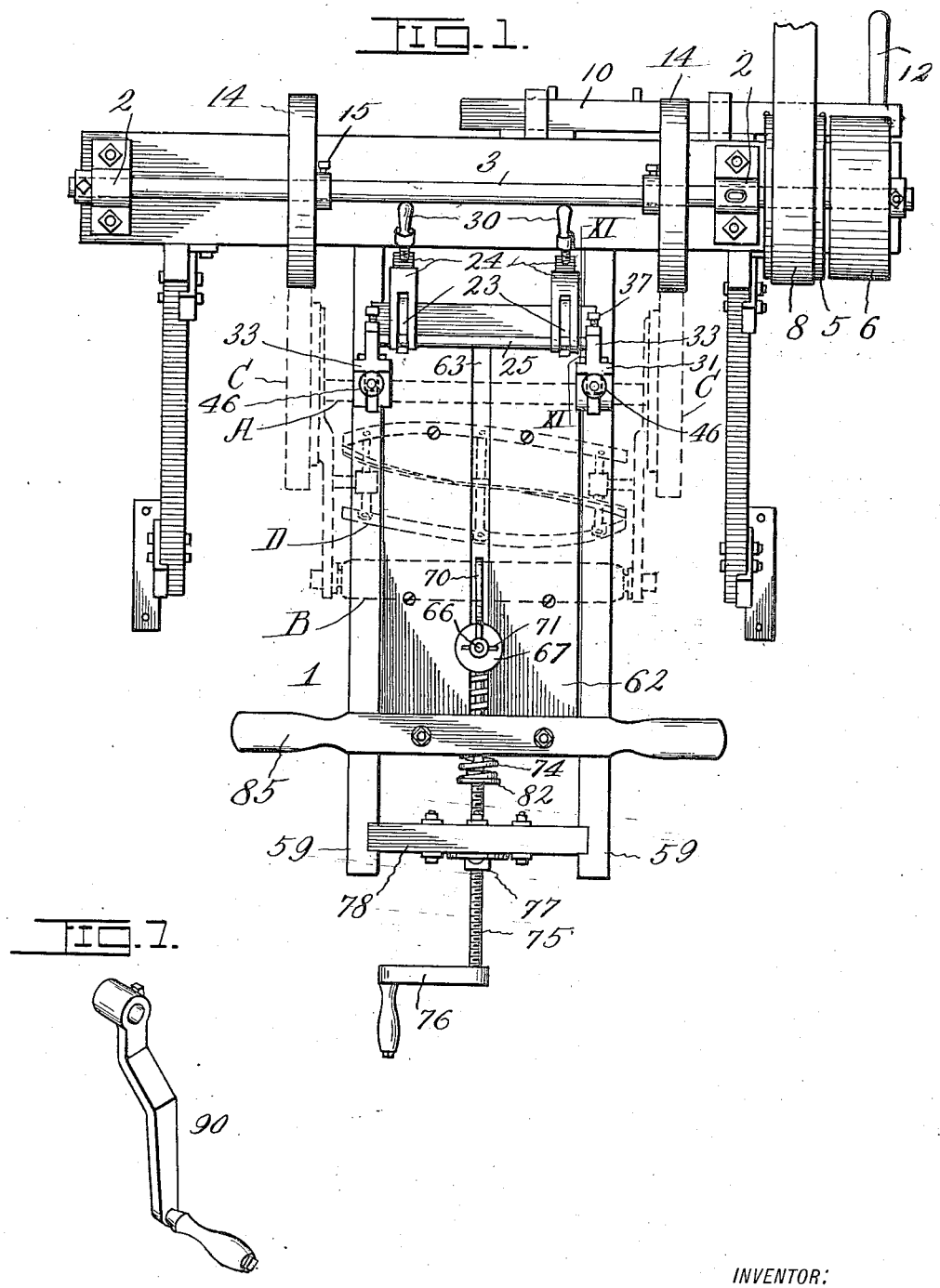
Figure 1 is a plan view of the machine showing a lawn mower in dotted lines thereon, with one of its drive wheels removed.

In carrying out the invention, I employ a substantial frame 1, provided at its upper rear portion with a pair of brackets 2, in the upper ends of which a horizontal shaft 3 is journaled. Said shaft 3 is provided at one end with a tight pulley 5 and a loose pulley 6, to receive a drive belt 8, which may be shifted from one pulley to the other as desired by a belt shifter 10 provided with a handle 12, whereby it is manually controlled.

14 designates a pair of friction wheels adjustably secured upon the shaft 3 by set screws 15. By loosening said set screws 15, the friction wheels 14 may be adjusted toward or away from each other and thus brought into alinement with the drive wheels of lawn mowers of different widths.

20 designates a pair of standards fixed upon the rear end of a carriage 22. As more clearly disclosed by Fig. 11, each standard 20 is provided at its upper end with a fixed jaw 23 and a movable jaw 24, which constitute a clamp for holding a transverse rod 25, or the front bar on certain types of lawn mowers. The movable jaw 24 is mounted at the upper end of the standard 20 on a pivot 26 and is adjusted in and out of engagement with the rods 25 by a screw 28, threaded through the lower portion of the jaw 24 and bearing against the rear side of the standard 20. For convenience in rotating the screw 28, the same is provided with a crank 30.

The rod 25 carries at each end an attachment 31 for holding the front end of certain types of lawn mowers which can not be readily engaged by the jaws 23 and 24. As disclosed more clearly by Figs. 8 and 9, each attachment 31 comprises a bracket 33, a slidable member 34, and a screw 35 for adjusting said slidable member 34 up and down. The brackets 33 are slidable on the rod 25 to accommodate lawn mowers of different widths. Said brackets 33 are also rockable on the rod 25, so that the forward end of the lawn mower may be raised high enough to insure its reel, clearing the top of the carriage 22. Set screws 37 are provided to secure the brackets 33 at any desired position upon the rod 25. The slidable member 34 operates in a slotted portion 38 at the forward side of the bracket 33 and is prevented from moving backwardly or forwardly independently of said bracket 33, by its rear wall 39 bearing against the bracket and its transverse pins 40 bearing against the rear of the slotted portion 38.

The lower forward portion of the slidable member 34 has a bearing member 41, which coacts with a bearing member 42 on the lower end of the slotted portion 38 of the bracket 33. Said bearing members 41 and 42 may directly engage the axle of a large lawn mower, but on lawn mowers having axles too small to fit snugly within the bearing members 41 and 42, I provide the same with a two-piece bushing 44 to receive the smaller axles. The screw 35 is provided at its upper end with a hand wheel 46, threaded through a lug 47 at the upper forward portion of the bracket 33. The lower smooth portion of the screw 35 is journaled in a forwardly-projecting lug 48 of the slidable member 34 and provided with collars 50, engaging the top and bottom of said lug 48 to cause the member 34 to move up and down with the screw 35.

In some types of lawn mowers the clearance between the reel and axle, or other transverse support, is not sufficient to admit the bearing members 41 and 42, in which event I employ a pair of clamps 50 (Figs. 9 and 10), comprising jaws 51 and 52 for holding the lawn mower, and shanks 53 and 54 to be gripped by the bushing 44. By loosening the bushings 44 the clamps 50 may be rocked to give the forward end of the lawn mower the necessary elevation to allow the reel to clear the top of the carriage.

The carriage 22 which supports the standards 20, is provided at a point adjacent each corner with guides 57 slidably mounted in grooves 58 in the two parallel members 59 of the frame 1. The guides 57 have slots 60 to receive bolts 61, whereby said guides are firmly secured to the carriage 22. By loosening the bolts 61 the guides may be adjusted laterally to take up lost motion between them and the slots 58 and thus prevent the carriage 22 from shifting laterally.

The top 62 of the carriage has a longitudinal slot 63 to receive a slidable block 65 carrying a fixedly-mounted upwardly-extending screw 66, which projects through a nut 67 adapted to be firmly adjusted into engagement with the carriage top 62 and reliably secure said block 65 at any point of its adjustment. The screw 66 is provided with a loosely mounted finger 70, adapted to engage over the roller B at the rear portion of the lawn mower to secure said roller firmly upon the carriage top 62. This is accomplished through the intermediacy of a thumb screw 71, threaded upon the screw 66 and bearing upon the finger 70.

The carriage 22 is yieldably urged forwardly to bring the drive wheels C, of the lawn mower into engagement with the friction wheels 14, by a coil spring 74 and a screw 75, which latter is provided with a crank 76 and threaded through a nut 77 fixed to a transverse member 78 of the frame 1. The coil spring 74 encircles a rod 79, bearing against the forward end of the screw 75 and slidably-mounted at its forward end in a tubular fitting 80, fixed in the rear end of the carriage 22. A seat 81 on the fitting 80 and a seat 82 at the rear end of the rod 79, are provided to receive the ends of the coil spring 74.

The rear end of the carriage 22 is provided with a transverse handle-bar 85, whereby said carriage 22 may be moved forwardly or backwardly to adjust the drive wheels C of the lawn mower in or out of engagement with the peripheries of the friction wheels 14.

Figure 2:
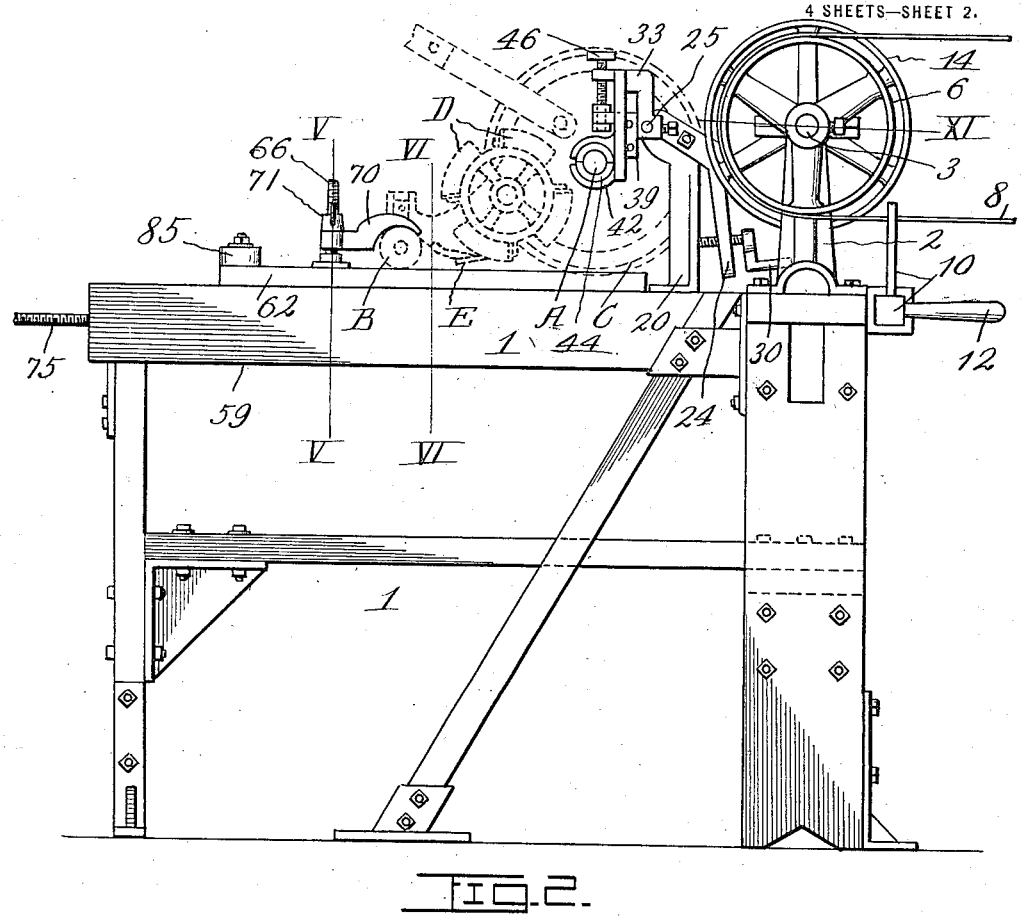
Fig. 2 is a side elevation of the machine with the lawn mower in dotted lines.
Figure 3:
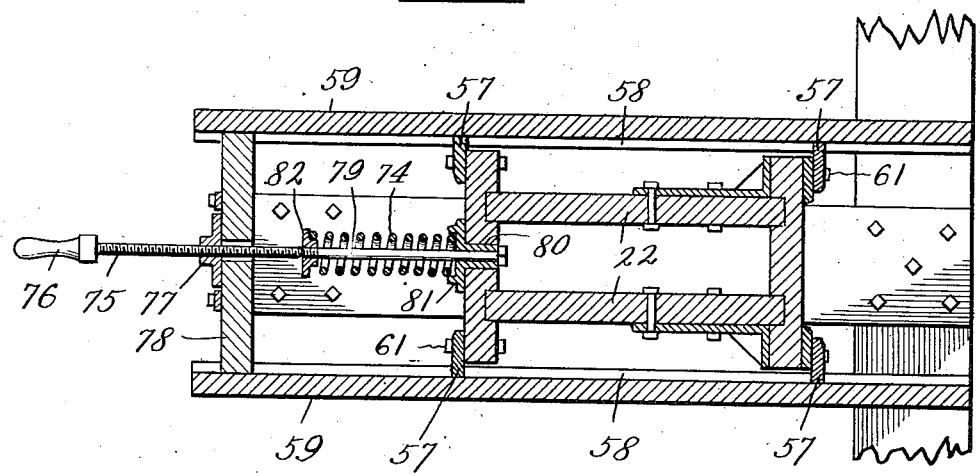
Fig. 3 is a horizontal section through line III—III of Fig. 4, showing the carriage and adjacent parts of the machine.

Assuming that a lawn mower of the type disclosed by dotted lines on Figs. 1 and 2 is to be sharpened, said lawn mower is placed in position with its axle, A, journaled in the bushings 44, and the roller B at the rear end of the lawn mower is clamped upon the top 62 of the carriage, through the intermediacy of the finger 70. The operator then grasps the handle-bar 85 and pushes the carriage forwardly until the drive wheels C contact the peripheries of the friction wheels 14. The screw 75 is next adjusted forwardly to compress the spring 74, so that the same will yieldably hold the carriage in position to retain the drive wheels C in frictional engagement with the wheels 14. The shaft 3 is then driven manually through the intermediacy of the crank 90, which may take the place of the loose pulley 6, or if power is available the shaft 3 is driven through the intermediacy of the tight pulley 5. Rotation of the shaft 3 and the friction wheels 14, causes the drive wheels C of the lawn mower to rotate. As the drive wheels C rotate they drive the reel containing the rotary knives D, which are sharpened as they pass the ledger plate E, the same having been previously adjusted in proper relation to the reel and given a coating of emery or other suitable grinding compound. Should the axle A, of the lawn mower be slightly bent and impart an eccentric motion to the drive wheels C, damage to the lawn mower, which would occur if the same were mounted on a rigid support, is overcome by the spring 74 which permits the carriage 22 to move backward and forward with the lawn mower and still hold the drive wheels C reliably in engagement with the friction wheels 14.

Having thus described my invention, what I claim and desire to secure by Letters Patent, is:

1. In a machine of the character described, means for rotating the drive wheels of a lawn mower, a carriage for holding said lawn mower in position for its drive wheels to be actuated by said means, and means to yieldably urge said carriage toward the means for rotating the lawn mower drive wheels.

2. In a machine of the character described, rotary means for actuating the reel driving mechanism of a lawn mower, a carriage to hold said lawn mower, adjustable guides on said carriage, means for securing said guides at any point of their adjustment, and grooved ways in which said guides are operably mounted.

3. In a machine of the character described, rotary means for actuating the reel driving mechanism of a lawn mower, a carriage, means on said carriage to support the forward portion of said lawn mower in proper relation to the rotary means, a finger to secure the rear portion of the lawn mower upon the carriage, a screw upon which said finger is loosely mounted, and a nut on said screw to force the finger firmly into engagement with the lawn mower.

4. In a machine of the character described, rotary means for actuating the reel driving mechanism of a lawn mower, a carriage, standards fixed upon said carriage, and clamp means on said standards to secure the lawn mower in proper relation to the rotary means.

5. In a machine of the character described, rotary means for actuating the reel driving mechanism of a lawn mower, a carriage, bushings to receive the axle of the lawn mower, two bearing members to support said bushings, two other bearing members to coact with the first two in firmly holding the bushings, brackets carrying the bearing members, and means supported by the carriage for holding said brackets.

6. In a machine of the character described, rotary means for actuating the reel driving mechanism of a lawn mower, a carriage, bushings, clamp means adjustable in said bushings and adapted to support the lawn mower in proper relation to the rotary means, and means supported by the carriage for holding the bushings.

In testimony whereof I affix my signature in the presence of two witnesses.

ERNEST C. SPRINGER.

Witnesses:
F. G. FISCHER,
L. J. FISCHER.